REMOVAL OF HYDROGEN SULFIDE FROM GASEOUS MIXTURES

Forrest G. Shultz and Gerald E. Chidester, Morgantown, and Fernand E. Collet, Star City, W. Va., assignors to the United States of America as represented by the Secretary of the Interior
No Drawing. Filed Oct. 10, 1969, Ser. No. 865,535
Int. Cl. B01d 53/14
U.S. Cl. 23—2S      3 Claims

ABSTRACT OF THE DISCLOSURE

Hydrogen sulfide is removed from gaseous mixtures by contacting the mixtures at elevated temperature with an absorbent comprising iron oxide and fly ash.

---

Gas producers have been receiving attention in recent years as a potential source of clean, pressurized gas for a variety of industrial purposes. Removal of hydrogen sulfide from the hot producer gas is desirable because hydrogen sulfide is an air pollutant and deteriorates equipment.

Temperature of the producer gas to be treated for $H_2S$ removal ranges from 1,000° to 1,500° F. To economically utilize the sensible heat of producer gas for power generation, the $H_2S$ must be removed near the generation temperature of the gas. This precludes the use of liquid absorbents and limits the process to the use of solid absorbents that can react with $H_2S$ at elevated temperatures. The material should also be regenerable for reuse through several cycles of $H_2S$ absorption followed by air regeneration.

Iron oxide has previously been used for desulfurization of industrial gases at elevated temperature. However, the iron oxide tends to disintegrate under the influence of high temperature and a sulfiding environment, resulting in troublesome accumulations of fine oxide dust.

It has now been found that this disadvantage can be overcome by the use of an absorbent consisting of sintered pellets made from a mixture of fly ash and ferric oxide, the fly ash comprising about 50 to 100 wt. percent of the composition. This absorbent also has the advantage that it is readily regenerated to an essentially fresh condition by means of treatment with air or oxygen.

Fly ash is a fine ash, with a particle size range of 5 to 100 microns, produced by combustion of powdered coal with forced draft and is usually collected by means of electrically precipitators. The absorbent of the invention is prepared by homogenously mixing the fly ash with iron oxide ($Fe_2O_3$) having a particle size of about 2 to 150 microns, with an average size of about 50 microns. This mixture is wet with enough water to permit formation of pellets. It will generally be desirable to add sufficient water to form a paste. The pellets are then dried at temperatures of about 200 to 800° F. to prevent disintegration during sintering, and they are then fired at temperatures between about 1600 to 2000° F. for a period of about 10 to 15 minutes. This treatment results in sintering to form hard pellets having a high degree of strength.

The resulting pellets are very efficient for removal of hydrogen sulfide from producer gases at temperatures of about 1000 to 1500° F. and at space velocities as high as 2000, or higher. In addition, the pellets are readily regenerated to an essentially fresh condition by passage of air or oxygen over them. Tests have shown that as many as nine cycles of $H_2S$ absorption at temperatures of 1000 to 1500° F. and air regeneration at temperatures of 1000 to 1250° F. may be carried out without loss of $H_2S$ absorption capability.

The invention will be more specifically illustrated by the following example:

EXAMPLE

Twenty-five grams of pure $Fe_2O_3$ having a particle size of 50 microns average, and 75 grams of fly ash, having a particle size between 5 and 100 microns, from a bituminous coal-burning power plant were thoroughly mixed and 38 ml. of water were added to wet the mixture. The mixture was then formed, into spherical pellets having a diameter of about ¼ inch. These pellets were then fired at 1800° F. for 15 minutes to cause sintering, resulting in high-strength pellets. The fly ash used in preparation of the pellets had the following composition:

| Constituent: | Percent |
|---|---|
| $SiO_2$ | 47.9 |
| $Al_2O_3$ | 23.8 |
| $Fe_2O_3$ | 15.7 |
| $P_2O_5$ | 0.6 |
| $TiO_2$ | 2.8 |
| $CaO$ | 3.6 |
| $MgO$ | 1.5 |
| $Na_2O$ | 1.9 |
| $K_2O$ | 2.2 |

Simulated producer gas having the composition: $N_2$—50.5%, CO—26%, $H_2$—17%, $CO_2$—5% and $H_2S$—1.5% was passed through a bed of the above-prepared absorbent pellets contained in an electrically heated section of 1-inch diameter by 5 feet long schedule 40 stainless-steel pipe. Alumina spheres in the bottom 22 inches of the pipe extended 10 inches into the hot zone of the furnace. These spheres supported the absorbent bed and preheated the gas. Regeneration facilities consisted of an air supply with pressure regulator and flow meter to supply an air stream through the system at 1000–1250° F. Purified producer gas and the regeneration gas were vented through a common system. Fifteen-inch depths of absorbent were subjected to a gas flow rate of 15 s.c.f.h. (7.08 liters per minute), which is equal to a space velocity of 2,000. Experiments were conducted at 1,000°, 1,250°, and 1,500° F. The runs were terminated when the $H_2S$ concentration in the effluent gas stream of the test bed, originally near zero, reached 2.3 mg./l. Sulfur capacities of the absorbent were calculated from the product of $H_2S$ concentration, flow rate, and time duration of the test.

Results are given in Table 1. Tests 1 through 10 give the absorptive capacity of the absorbent through nine $H_2S$ absorption-air regeneration cycles run successively on one batch of absorbent. The data show that there is no appreciable loss in absorptive capacity, nor was there any attrition of the pellets.

TABLE 1

| | 75% fly ash, 25% $Fe_2O_3$ ||
|---|---|---|
| | Absorption temp., ° F. | Capacity, g. sufur/100 g. material |
| Test No.: | | |
| 1 | 1,000 | 8.7 |
| 2 | 1,000 | 8.2 |
| 3 | 1,000 | 8.1 |
| 4 | 1,250 | 16.4 |
| 5 | 1,250 | 21.1 |
| 6 | 1,250 | 16.5 |
| 7 | 1,250 | 13.3 |
| 8 | 1,250 | 15.8 |
| 9 | 1,500 | 41.1 |
| 10 | 1,500 | 42.7 |

What is claimed is:
1. A process for removal of hydrogen sulfide from a gaseous mixture comprising contacting the mixture at a temperature of about 1000 to 1500° F. with an absorbent comprising a sintered admixture of coal fly ash and iron oxide, said fly ash comprising at least 50% of said mixture.

2. The process of claim 1 in which the gaseous mixture is producer gas.

3. The process of claim 1 in which the absorbent is in the form of pellets.

References Cited

UNITED STATES PATENTS

| | | | |
|---|---|---|---|
| 1,900,667 | 3/1933 | Raffloer | 23—3 |
| 3,328,180 | 6/1967 | Ban | 106—41 |
| 3,492,083 | 1/1970 | Lowicki et al. | 23—2 |

OTHER REFERENCES

"Chemical Abstracts," vol. 63, 1965, p. 2806.

Weintraub, M., et al., "Journal of Engineering for Power," October 1961, pp. 444–447.

OSCAR R. VERTIZ, Primary Examiner

G. O. PETERS, Assistant Examiner

U.S. Cl. X.R.

23—3